United States Patent [19]

Mills

[11] 3,830,322

[45] Aug. 20, 1974

[54] POSTAL SCALE RULER

[76] Inventor: Archie W. Mills, 2941 S. Michigan Ave., Chicago, Ill. 60616

[22] Filed: Sept. 29, 1971

[21] Appl. No.: 184,805

Related U.S. Application Data

[63] Continuation-in-part of Ser. No. 60,331, Aug. 3, 1970, abandoned.

[52] U.S. Cl. ............................................. 177/246
[51] Int. Cl. ............................................ G01g 1/18
[58] Field of Search ....... 177/126, 245, 246, DIG. 9

[56] References Cited
UNITED STATES PATENTS

| | | | |
|---|---|---|---|
| 2,284,526 | 5/1942 | Linsley............................... | 177/126 |
| 2,949,287 | 8/1960 | Linsley............................... | 177/246 |
| 3,224,516 | 12/1965 | Stelzer............................ | 177/245 X |

Primary Examiner—George H. Miller, Jr.
Attorney, Agent, or Firm—Hill, Sherman, Meroni, Gross & Simpson

[57] ABSTRACT

This invention provides a device for determining the postage for letters and the like. The device comprises an elongated flat beam, a transverse fulcrum positioned on one surface of the beam, the fulcrum being positioned at a distance less than one half the length of the beam from one end of the beam; and a weight indicating scale on the opposite surface of the beam, the scale being extended longitudinally from the end of the beam along the corresponding shorter portion of the beam, whereby when a letter with one of its longitudinal edges forward on the scale is slid flatwise along the surface of the beam with the center of gravity of the letter at least approximately on the longitudinal axis of the beam, the beam is balanced when the edge of the letter is positioned on an area of the scale corresponding to the weight of the letter.

5 Claims, 2 Drawing Figures

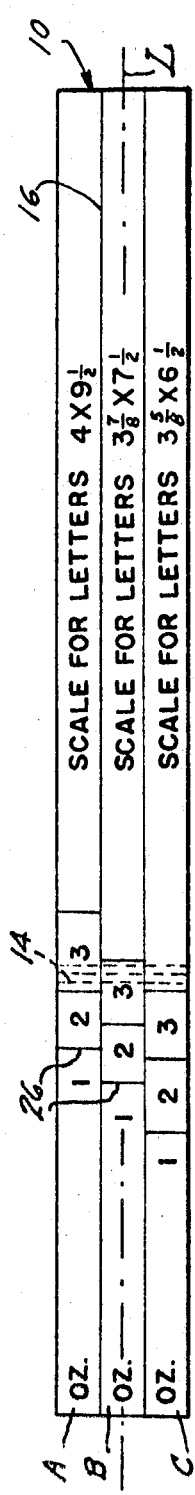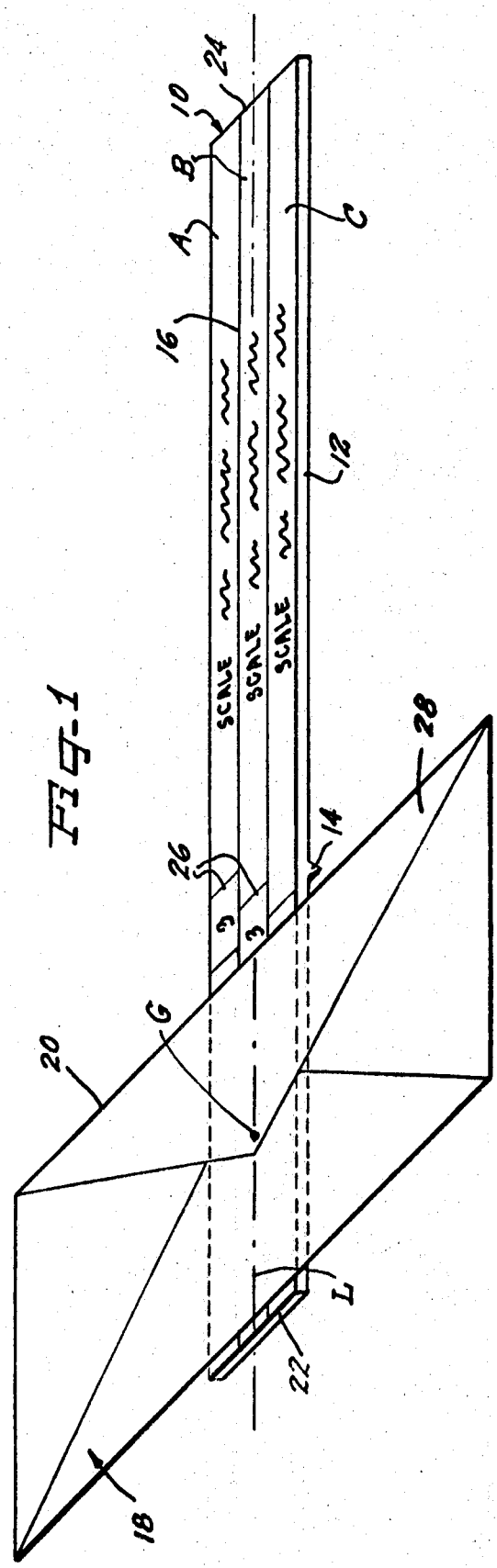

POSTAL SCALE RULER

CROSS REFERENCE TO OTHER APPLICATIONS

This application is a continuation-in-part of U.S. application Ser. No. 60,331, filed Aug. 3, 1970 now abandoned.

BACKGROUND OF THE INVENTION

This invention relates to a device for determining postage for letters of various sizes and weights.

There are various types of devices, mechanisms and scales that have been developed for determining the postage needed for mailing letters, packages and the like. These postal scales can vary from the highly accurate and sophisticated scales used primarily in Government post offices and large companies handling a great deal of mail to the simple devices used in small offices where a small amount of mail is handled each day.

These simple devices are generally not very accurate since they do not include any balanced scales. These simple devices that have been developed usually include a movable scale or fulcrum to measure and determine the postage for different size letters. Other devices of this type have been provided with movable counterweights to balance a scale on a fulcrum with a letter placed on the opposite side of the scale. Although these devices have been simple and practical since they can be used for other purposes as a ruler or letter opener, they have movable parts which can be easily loosened and distorted during normal use, thus rendering the device ineffective for determining postage on letters.

There is a need for a simple device for determining postage for letters which is inexpensive and durable. This device should preferably be made of one integral piece of material and not having any movable parts.

SUMMARY OF THE INVENTION

I have, accordingly, developed a postal scale device which is practical, effective and adapted to accurately determine the postage for letters of various sizes and weights. The device comprises: an elongated flat beam; a transverse fulcrum positioned on one surface of the beam, the fulcrum being positioned at a distance less than one half the length of the beam from one end of the beam; and a weight indicating scale on the opposite surface of the beam, the scale being extended longitudinally from the end of the beam along the corresponding shorter portion of the beam, whereby when a letter with one of its longitudinal edges forward on the scale is slid flatwise along the surface of the beam with the center of gravity of the letter at least approximately on the longitudinal axis of the beam, the beam is balanced when the edge of the letter is positioned on an area of the scale corresponding to the weight of the letter.

Therefore, an important object of the present invention is to provide a one-piece postal scale device which is practical and effective.

Another object of the present invention is to provide a practical postal scale measuring device which can also be utilized in the office as a ruler and the like.

Other objects, features and advantages of the present invention will be readily apparent from the following description of the preferred embodiments thereof, taken in conjunction with the accompanying drawings, although variations and modifications may be effected without departing from the spirit and scope of the novel concepts of the disclosure.

BRIEF DESCRIPTION OF THE DRAWINGS

FIG. 1 is a perspective view of a device embodying the present invention, illustrating the process of determining postage; and FIG. 2 is a view of one side of the device shown in FIG. 1, illustrating the scales formed thereon.

DESCRIPTION OF THE PREFERRED EMBODIMENT

Referring initially to FIG. 1, there is shown a postal scale device 10 embodying the present invention. The postal scale is essentially an elongated flat beam 10, the size and length of a 12 inch ruler. The flat beam 10 may be a ruler with an inch scale (not shown) marked on its top surface 12.

On the top surface 12 of the beam or ruler 10, a transverse fulcrum 14 is provided. The fulcrum 14 is formed on the beam 10 and is adapted to rest upon a horizontal supporting surface.

As shown in detail in FIG. 2, a series of weight indicating scales A, B, C are provided on the bottom surface 16 of the beam. As can be seen, different weight scales are provided for the different standard sized letters.

Generally, as illustrated in FIG. 1, in determining the postage for a letter, the letter 18 with its longitudinal edge 20 forward is slid along the surface of the beam until the beam 10 is balanced on the fulcrum 14. The area of the scale relating to the size of the letter envelope, on which the edge 20 lies in when the beam 10 is balanced indicates the weight of the letter, and accordingly the postage.

The beam 10 and the fulcrum 14 are preferably made of the same material which can be a lightweight plastic, wood or metal. The plastic and wood are preferred because they are more inexpensive and practical for making a low cost device, as the present postal scale.

The fulcrum 14, although it is preferred to be formed as a part of the beam or ruler 10, can be a separate piece integrally bonded to the ruler or beam. This is necessary in order to provide a one-piece postal scale device without any movable parts that can become loose and defective.

The position at which the fulcrum 14 is formed on the beam 10, depends on the material used to make the beam and its overall weight. Generally, the fulcrum is placed at least at a distance less than one half the length of beam from an end 22 of the beam. Where the beam 10 is made of a lightweight plastic or wood and weighs about one ounce, the fulcrum 14 is positioned about one third the length of the beam from end 22 and two thirds the beam's length from end 24.

The series of weight indication scales A, B and C are set up on the surface 16 by using letters of known weights. For example, letters of envelope size 3⅞ inches × 7½ inches, weighing 1, 2 and 3 ounces are separately placed flatwise on the surface 16 of the beam 10, as shown in FIG. 1. In the case of the 1-ounce letter, as with the 2- and 3-ounce letters, it is slid along the surface 16 with its center of gravity G, at least approximately on the longitudinal axis L, of the beam 10 until the beam is balanced. At the point of balance, a transverse line 26 is marked on the proper scale B to indicate a one-ounce weight. The same procedure is followed for the 2- and 3-ounce letters as well as the letters fo different sizes, i.e., 4 inches × 9½ inches and 3⅝ inches × 6½ inches. Accordingly, as illustrated in FIG. 2, the weight indication scales A, B and C are provided for the different size letters.

The weight indication scales vary, depending on the type of material used to make the beam 10 and the position of the fulcrum 14 on the beam. For a device or beam made of a heavier material, such as steel, the weight scales will be smaller than the scales illustrated in FIG. 2 for a beam made of a lightweight material, i.e., a plastic or wood. Also, the scales are not limited to three ounces, they can range up to at least eight ounces, and more. However, larger scales are generally impractical because most letters do not weigh more than four to five ounces.

In using the postal scale device described above, the postage is determined in a manner similar to that by which the indication scales A, B and C were set up on the surface 16 of the beam 10.

Initially, the beam 10 is placed inversely with the fulcrum 14 on a horizontal support, e.g. a table. Then, the letter 18, as illustrated in FIG. 1, is placed flatwise on the scale-bearing surface 16 with its forward longitudinal edge 20 aligned substantially parallel to the ends 22 and 24 of the beam and its center of gravity G at least approximately on the longitudinal axis L of the beam 10. As shown in FIG. 1, the center of gravity G of most letters is generally near the vertex of the flap 28 of the letter. The letter is slid gently on the surface 16 and over the scales until the beam is balanced. The area on the scale corresponding to the size of the letter where the forward edge 20 of the letter 18 lies, indicates the weight of the letter, and accordingly, the necessary postage for the letter. For example, when the edge 20 of a letter size 4 inches × 9½ inches, lies in the area marked "3" of scale C, the weight of the letter is at least 3 ounces, and the postage at 8 cents per ounce is 24 cents.

It will be apparent from the above description that a simplified but effective postal scale has been provided by the present invention, and although variations and modifications can be effected by those skilled in the art it should be understood that I wish to include all such modifications which come within the scope of my invention as defined in the appended claims.

I claim as my invention:

1. A one-piece device for determining mailing postage for letters and the like of various sizes and weights, said device comprising: an elongated flat beam; a transverse fulcrum on one surface of said beam, said fulcrum being fixed on said beam at a position less than one half the length of the beam from one end of the beam; and a weight indicating scale on the opposite surface of the beam, the scale extending longitudinally from said end of the beam along the corresponding shorter portion of said beam, whereby when a letter with one of its longitudinal edges forward on the scale is slid flatwise along the surface of the beam with the center of gravity of the letter at least approximately on the longitudinal axis of said beam, the beam is balanced when the edge of the letter is positioned on an area of the scale corresponding to the weight of the letter.

2. A device according to claim 1, wherein a series of weight indicating scales is provided on said surface of said beam for different size letters.

3. A device according to claim 1, wherein the fulcrum is positioned at a distance of one third the length of said beam from said end.

4. A one-piece device for determining mailing postage for letters and the like of various sizes and weights, said device comprising:

an elongated flat beam;

a transverse fulcrum on one surface of said beam, said fulcrum being fixed on said beam at a position less than one half the length of the beam from one end of the beam; and a series of weight indicating scales for different size letters on the opposite surface of the beam, the scales extend longitudinally from said end of the beam along the corresponding shorter portion of said beam, whereby when a letter with one of its longitudinal edges forward on the scale corresponding to the size of the letter, is slid flatwise along the surface of the beam with the center of gravity of the letter at least approximately on the longitudinal axis of said beam, the beam is balanced when the edge of the letter is positioned on an area of the scale corresponding to the weight of the letter.

5. A device according to claim 4, wherein the fulcrum is positioned at a distance of one third the length of said beam from said end.

* * * * *